(12) United States Patent
Cron et al.

(10) Patent No.: US 10,105,989 B2
(45) Date of Patent: Oct. 23, 2018

(54) SHEAR BAND WITH INTERLACED REINFORCEMENTS

(75) Inventors: Steve Cron, Simpsonville, SC (US); Timothy B. Rhyne, Greenville, SC (US)

(73) Assignee: COMPAGNIE GENERAL DES ETABLISSEMENTS MICHELIN, Clermont-Ferrand (FR)

(*) Notice: Subject to any disclaimer, the term of this patent is extended or adjusted under 35 U.S.C. 154(b) by 1 day.

(21) Appl. No.: 14/295,903

(22) PCT Filed: Dec. 22, 2011

(86) PCT No.: PCT/US2011/066793
§ 371 (c)(1),
(2), (4) Date: Jun. 4, 2014

(87) PCT Pub. No.: WO2013/095499
PCT Pub. Date: Jun. 27, 2013

(65) Prior Publication Data
US 2014/0326374 A1 Nov. 6, 2014

(51) Int. Cl.
| B60C 7/00 | (2006.01) |
| B60C 7/10 | (2006.01) |
| B60C 7/22 | (2006.01) |
| B60C 9/22 | (2006.01) |
| B60C 7/14 | (2006.01) |

(52) U.S. Cl.
CPC ............... *B60C 7/00* (2013.01); *B60C 7/102* (2013.01); *B60C 7/22* (2013.01); *B60C 9/22* (2013.01); *B60C 2007/146* (2013.01)

(58) Field of Classification Search
CPC .. B60C 7/00; B60C 7/14; B60C 7/102; B60C 7/20; B60C 7/22
See application file for complete search history.

(56) References Cited

U.S. PATENT DOCUMENTS

| 1,145,063 | A | * | 7/1915 | Hale | ......................... B60C 7/22 152/393 |
| 1,287,719 | A | * | 12/1918 | Mackay | ..................... B60C 7/14 152/268 |
| 1,349,914 | A | * | 8/1920 | Beach | .................... B29D 30/02 152/323 |
| 3,730,244 | A | | 5/1973 | Ross | |

(Continued)

FOREIGN PATENT DOCUMENTS

| FR | 2566335 | 12/1985 |
| FR | 2566335 A1 | 12/1985 |

(Continued)

OTHER PUBLICATIONS

International Search Report and Written Opinion of the International Searching Authority.

(Continued)

Primary Examiner — Frank B Vanaman
(74) Attorney, Agent, or Firm — Dority & Manning, P.A.

(57) ABSTRACT

A shear band that may be used e.g., in a non-pneumatic tire is provided. The shear band uses interlaced reinforcing elements positioned within a shear layer of elastomeric material. A variety of configurations may be used to create the interlaced positioning of the reinforcing elements including e.g., a horizontal diamond or vertical diamond configuration.

31 Claims, 6 Drawing Sheets

(56) References Cited

U.S. PATENT DOCUMENTS

| | | | |
|---|---|---|---|
| 4,573,510 A * | 3/1986 | Ippen | B60B 17/02 152/159 |
| 4,715,419 A | 12/1987 | Kawasaki et al. | |
| 5,246,051 A * | 9/1993 | Inada | B60C 9/0042 152/451 |
| 5,291,930 A * | 3/1994 | Kikuchi | B60C 9/20 152/451 |
| 5,643,511 A | 7/1997 | Pluyter | |
| 6,321,808 B1 | 11/2001 | Spragg | |
| 6,374,887 B1 * | 4/2002 | Subotics | B60C 7/12 152/270 |
| 6,769,465 B2 | 8/2004 | Rhyne | |
| 6,994,134 B2 | 2/2006 | Grah | |
| 7,013,939 B2 | 3/2006 | Rhyne | |
| 7,201,194 B2 | 4/2007 | Rhyne | |
| 7,671,128 B1 * | 3/2010 | Thielen | C08L 13/00 524/526 |
| 2001/0001971 A1 * | 5/2001 | Cottrell | B60C 15/0018 152/516 |
| 2002/0043319 A1 * | 4/2002 | Meraldi | B60C 9/1821 152/527 |
| 2006/0113016 A1 * | 6/2006 | Cron | B60C 7/18 152/11 |
| 2007/0056670 A1 * | 3/2007 | Sandstrom | B29D 30/04 152/310 |
| 2007/0267116 A1 | 11/2007 | Rhyne | |
| 2010/0018621 A1 | 1/2010 | Thompsom | |
| 2010/0051160 A1 * | 3/2010 | Daghini | B60C 15/04 152/527 |
| 2010/0193097 A1 | 8/2010 | McNier | |
| 2011/0174422 A1 * | 7/2011 | King | B60C 15/06 152/541 |
| 2011/0253281 A1 | 10/2011 | Christenbury | |
| 2012/0318417 A1 * | 12/2012 | Dotson | B60C 7/10 152/17 |

FOREIGN PATENT DOCUMENTS

| | | |
|---|---|---|
| GB | 165662 A | 6/1920 |
| GB | 165662 | 7/1921 |
| JP | 61-009314 | 1/1986 |
| JP | 2001-121917 | 5/2001 |
| JP | 2006-117130 | 5/2006 |
| JP | 2011-183894 | 9/2011 |

OTHER PUBLICATIONS

Extended European Search Report and Written Opinion, dated Jun. 30, 2015, 7 pages.

* cited by examiner

SHEAR BAND WITH INTERLACED REINFORCEMENTS

FIELD OF THE INVENTION

The subject matter of the present invention relates to the reinforcement of a shear band as may be used in a non-pneumatic tire.

BACKGROUND OF THE INVENTION

The details and benefits of non-pneumatic tire constructions are described e.g., in U.S. Pat. Nos. 6,769,465; 6,994,134; 7,013,939; and 7,201,194. Certain non-pneumatic tire constructions propose incorporating a shear band, embodiments of which are described in e.g., U.S. Pat. Nos. 6,769,465 and 7,201,194, which are incorporated herein by reference. Such non-pneumatic tires provide advantages in tire performance without relying upon a gas inflation pressure for support of the loads applied to the tire.

By way of background to the invention, FIG. 1 provides a cross-sectional view of an exemplary embodiment of a non-pneumatic tire 100 incorporating a shear band 110. Tire 100 also includes a plurality of tension transmitting elements, illustrated as web spokes 150, extending transversely across and inward from shear band 110. A mounting band 160 is disposed at the radially inner end of the web spokes. The mounting band 160 anchors the tire 100 to a hub 10. A tread portion 105 is formed at the outer periphery of the shear band 110 and may include e.g., grooves or ribs thereon.

The shear band 110 of tire 100 includes a shear layer as well as an innermost reinforcement layer adhered to the radially innermost extent of the shear layer and an outermost reinforcement layer adhered to the radially outermost extent of the shear layer. The reinforcement layers have a tensile stiffness that is greater than the shear stiffness of the shear layer so that the shear band undergoes shear deformation under vertical load. More specifically, as set forth in U.S. Pat. No. 7,201,194, when the ratio of the elastic modulus of the reinforcement layer to the shear modulus of the shear layer ($E'_{membrane}/G$), as expressed in U.S. Pat. No. 7,201,194, is relatively low, deformation of shear band 110 under load approximates that of a homogenous band and produces a non-uniform ground contact pressure. Alternatively, when this ratio is sufficiently high, deformation of the shear band 110 under load is essentially by shear deformation of the shear layer with little longitudinal extension or compression of the reinforcement layers. As indicated in FIG. 1, a load L placed on the tire axis of rotation X is transmitted by tension in the web spokes 150 to the annular band 110. The annular shear band 110 acts in a manner similar to an arch and provides circumferential compression stiffness and a longitudinal bending stiffness in the tire equatorial plane sufficiently high to act as a load-supporting member. Under load, shear band 110 deforms in contact area CA with the ground surface through a mechanism including shear deformation of the shear band 110. The ability to deform with shear provides a compliant ground contact area CA that acts similar to that of a pneumatic tire, with similar advantageous results.

In addition to the embodiments shown in U.S. Pat. No. 7,201,194, there are several non-pneumatic tire constructions that can incorporate a shear band. For example, U.S. Pat. No. 6,769,465 relates to a structurally supported resilient tire that supports a load without internal air pressure. In an exemplary embodiment, this non-pneumatic tire includes a ground contacting portion and side wall portions that extend radially inward from the tread portion and anchor in bead portions that are adapted to remain secure to a wheel during rolling of the tire. A reinforced annular band is disposed radially inward of the tread portion. This shear band includes at least one homogenous shear layer, a first membrane adhered to the radially inward extent of the shear layer and a second membrane adhered to the radially outward extent of the shear layer. Each of the membranes has a longitudinal tensile modulus sufficiently greater than the dynamic shear modulus of the shear layer so that, when under load, the ground contacting portion of the tire deforms to a flat contact region through shear strain in the shear layer while maintaining constant length of the membranes. Relative displacement of the membranes occurs substantially by shear strain in the shear layer. The invention of U.S. Pat. No. 6,769,465 provides several advantages including, for example, the ability to operate without an inflation pressure and the flexibility to adjust the vertical stiffness of the tire somewhat independently of the ground contact pressure.

With both pneumatic and non-pneumatic tires, it is desirable to improve the fuel efficiency of the tire. Such an improvement can be achieved by e.g., reductions in the overall size or mass of the tire and/or using lower loss materials in the tire. For non-pneumatic tires employing a shear band having a homogenous shear layer, challenges are encountered in making such reductions. For example, the use of materials for the shear layer that have low energy dissipation can lead to an unacceptable, offsetting increase in the mass of the material required due to typically lower shear modulus of these materials.

Accordingly, a shear band that can provide improvement in fuel efficiency by e.g., lowering mass and/or rolling resistance would be beneficial. Such a shear band that can be incorporated into a variety of non-pneumatic tire constructions would be particularly useful.

SUMMARY OF THE INVENTION

Aspects and advantages of the invention will be set forth in part in the following description, or may be obvious from the description, or may be learned through practice of the invention.

In one exemplary embodiment, the present invention provides an annular shear band defining axial, radial, and circumferential directions. The annular shear band includes an annular shear layer constructed from at least one elastomeric material. A plurality of discrete, annular reinforcing elements are positioned along a plurality of axially-oriented rows throughout the annular shear layer. The reinforcing elements are separated from one another by a predetermined distance, $w_s$. The reinforcing elements are interlaced along the axial or radial direction of the shear band.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

Figure 1:
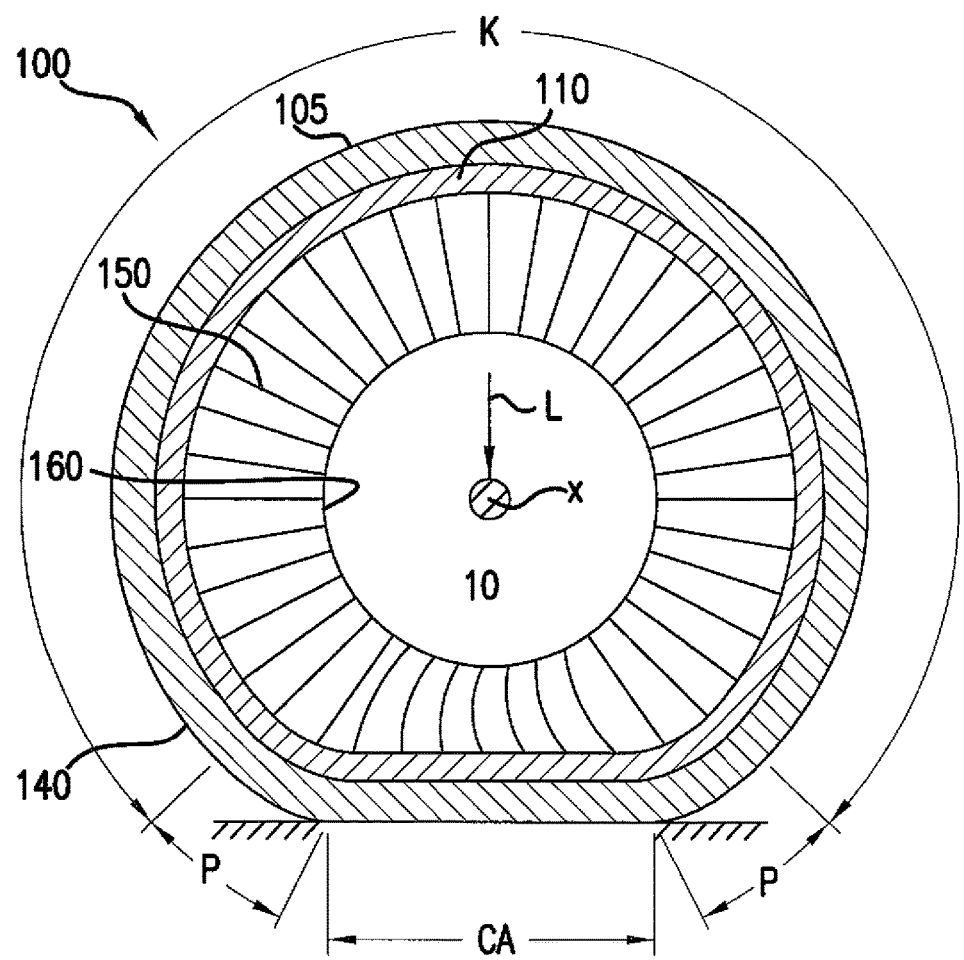
FIG. 1 provides a schematic side view of an exemplary embodiment of a tire incorporating a shear band.

The present invention provides a shear band that may be used e.g., in a non-pneumatic tire. The shear band uses interlaced reinforcing elements positioned within a shear layer of elastomeric material. A variety of configurations may be used to create the interlaced positioning of the reinforcing elements. For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

The following terms are defined as follows for this disclosure:

"Axial direction" or the letter "A" in the figures refers to a direction parallel to the axis of rotation of e.g., the shear band, tire, and/or wheel as it travels along a road surface.

"Radial direction" or the letter "R" in the figures refers to a direction that is orthogonal to the axial direction and extends in the same direction as any radius that extends orthogonally from the axial direction.

"Equatorial plane" means a plane that passes perpendicular to the axis of rotation and bisects the shear band and/or wheel structure.

"Interlaced" refers to the manner in which discrete reinforcements or reinforcing elements of the shear band are arranged within the shear layer as will be further described with reference to the figures. Where reinforcing elements are interlaced along the axial direction, imaginary lines extending between the center points of the reinforcing elements in adjacent, axially oriented rows will form a rhombus or horizontal diamond having non-orthogonal angles between the sides of the rhombus. In this interlaced, horizontal diamond configuration, the reinforcing elements of adjacent, axially-oriented rows are closer together than reinforcing elements within the same axially-oriented row. Where reinforcing elements are interlaced along the radial direction, imaginary lines extending between the center point of reinforcing elements in adjacent, axially oriented rows will form a rhombus or vertical diamond having non-orthogonal angles between the sides of the rhombus. In this interlaced, vertical diamond configuration, the reinforcing elements along the same, axially-oriented row will be closer together than reinforcing elements in non-adjacent, axially-oriented rows. As will be understood by one of skill in the art using the teachings disclosed herein, during tire manufacture a perfect positioning of reinforcing elements into the shape of a vertical or horizontal diamond may not be possible due to e.g., the movement of materials during the manufacturing process. As such, slight displacements of the reinforcement elements of either diamond configuration can occur.

Figure 2:
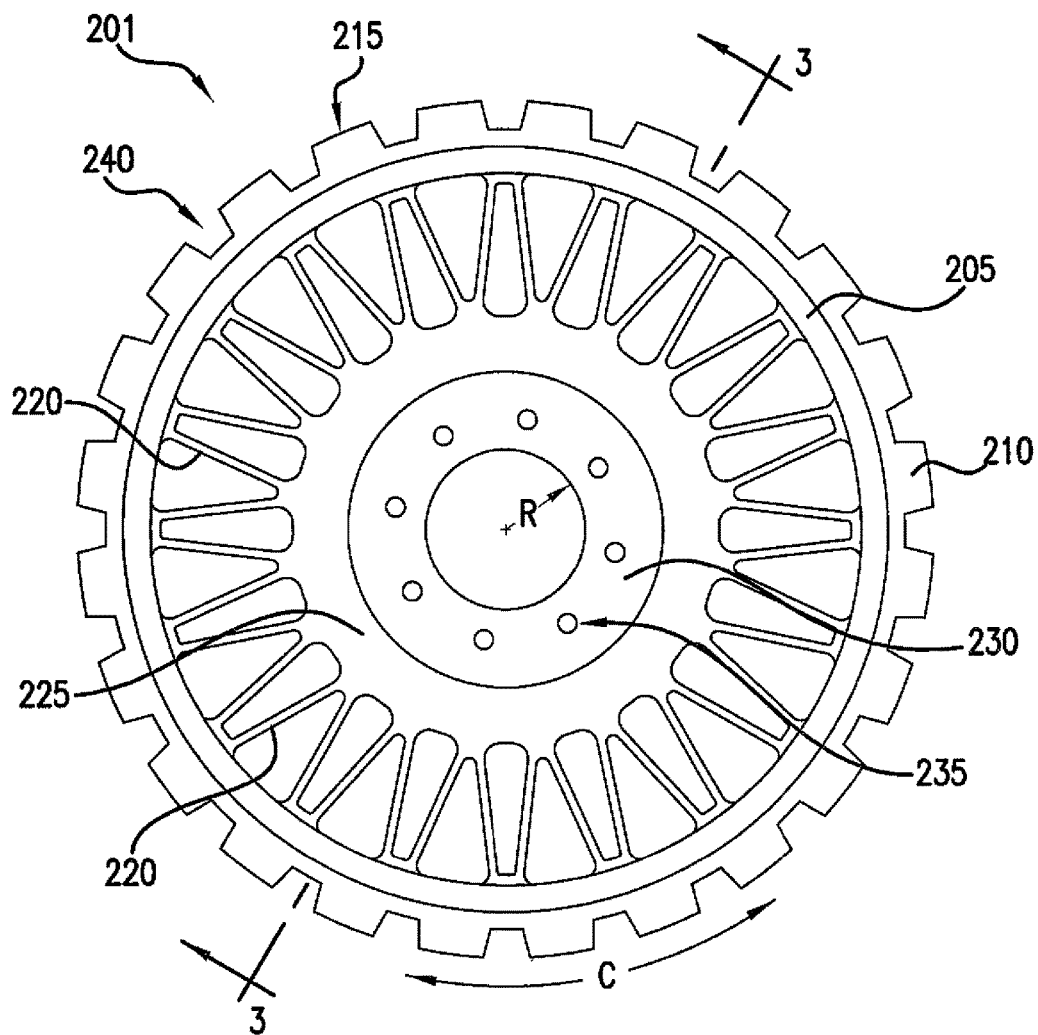
FIG. 2 provides a perspective view of the exemplary embodiment of a tire incorporating a shear band of the present invention.
Figure 3:
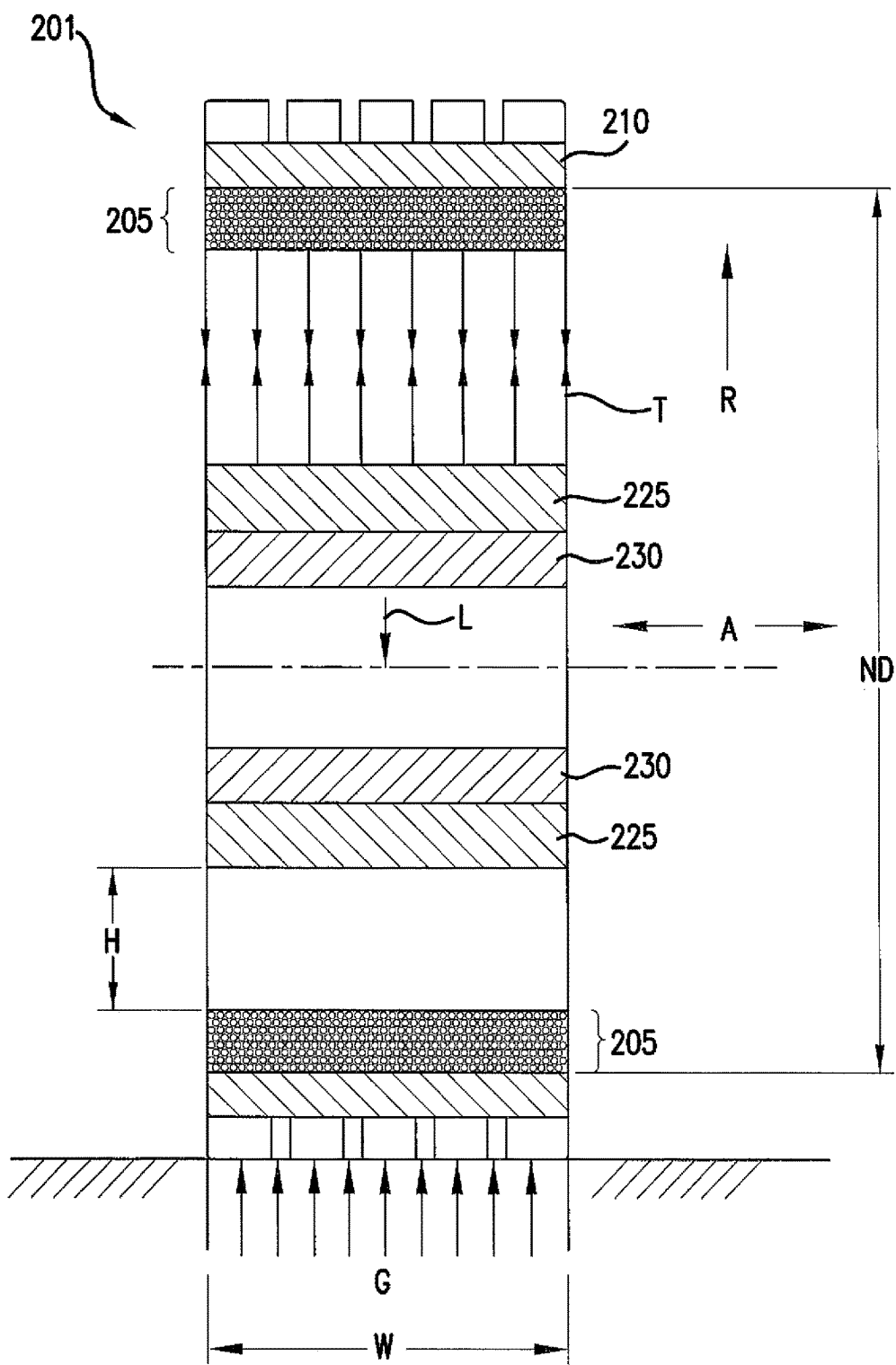
FIG. 3 provides a cross-sectional view of the tire of FIG. 2 as taken along line 3-3 in FIG. 2.

FIG. 2 provides an exemplary embodiment of a non-pneumatic tire 201 as may incorporate a shear band of the present invention. FIG. 3 provides a cross-sectional view of tire 201 taken along line 3-3 in FIG. 2. Tire 201 as shown in FIGS. 2 and 3 has an annular shear band 205 and a plurality of tension transmitting elements, illustrated as web spokes 220, extending transversely across and inward from band 205, to a mounting band 225, at the radially inner end of the web spokes 220. Mounting band 225 anchors tire 201 to a hub 230 with holes 235 for mounting. Tire 201 can be mounted onto hub 230 or can be constructed integrally with hub 230.

A tread portion 210 is formed at the outer periphery of band 205. Tread portion 210 may be an additional rubber layer bonded on the band 205 as shown in FIG. 2, for example, so as to provide different traction and wear properties than the material used to construct band 205. Alternatively, tread portion 210 may be formed as part of the outer surface of the compliant band 205. In still another alternative, band 205 may be enclosed within one or more rubber materials connected with tread portion 210. Tread features may be formed in the tread portion 210 and may include blocks 215 and grooves 240.

As mentioned, web spokes 220 in the exemplary embodiment of FIGS. 2 and 3 extend transversely across wheel 201, which as used herein means that the web spokes 220 extend from side to side of wheel 201 and may be aligned with the axis of rotation, or may be oblique to the wheel axis. Further, "extending inward" means that web spokes 220 extend between band 205 and mounting band 225, and may lie in a plane radial to the wheel axis or may be oblique to the radial plane. In addition, as shown in FIG. 2, web spokes 220 may actually include spokes at different angles to the radial plane. Various shapes and patterns may be used as shown, e.g., in U.S. Pat. No. 7,013,939 and WO 2008/118983. Accordingly, as will be understood by one of ordinary skill in the art, the present invention is not limited to the radial spokes shown in the figures as other shapes and orientations may be used as well as a different number of spokes than is shown.

Annular shear band 205 supports the load on wheel 201 and resiliently deforms to conform to the road (or other supporting surface) to provide traction, comfort, and handling capabilities. More particularly, as described in U.S. Pat. No. 7,013,939, when a load L is placed on the wheel 201 through hub 230, band 205 acts compliantly in that it bends and otherwise deforms for ground contact (arrows G in FIG. 3 of the present application) and forms a contact patch, which is the portion of wheel 201 that is in contact with the ground under such load. The portion of band 205 that is not in ground contact acts in a manner similar to an arch and provides a circumferential compression stiffness and a longitudinal bending stiffness in the equatorial plane sufficiently high to act as a load-supporting member.

The load on the wheel 201, transmitted from the vehicle (not shown) to hub 230 essentially hangs by web spokes 220 (e.g., tensile forces as shown by arrows T in FIG. 3) attached to the load supporting portion of band 205 (indicated by arrows K in FIG. 1). Web spokes 220 in the ground contacting region do not experience tensile loading due to the load—and, e.g., in certain exemplary embodiments spokes 220 can even buckle under load above the ground contacting region. As wheel 201 rotates, of course, the specific portion of the compliant band 205 acting as an arch continually changes, however, the concept of an arch is useful for understanding the load supporting mechanism. The amount of bending of band 205, and accordingly, the size of the contact patch is proportional to the load. The ability of band 205 to bend resiliently under the load provides a compliant ground contact area that acts similar to that of a pneumatic tire, with similar advantageous results.

Still referring to FIGS. 2 and 3, web spokes 220 are substantially sheet-like elements having a length H in the radial direction, a width W in the axial direction corresponding generally to the axial width of the compliant band 205, although other widths W may be used including widths W that vary along the radial direction. Web spokes 220 also have a thickness (i.e. a dimension perpendicular to length H and width W) that is generally much less than either the length H or the width W, which allows a web spoke to buckle or bend when under compression. Thinner web spokes will bend when passing through the contact area with substantially no compressive resistance, that is, supplying no or only insignificant compressive force to load bearing. As the thickness of web spokes 220 is increased, the web spokes may provide some compressive load bearing force in the ground contact area. The predominant load transmitting action of web spokes 220 as a whole, however, is in tension (arrows T in FIG. 3). The particular web spoke thickness may be selected to meet the specific requirements of the vehicle or application.

As seen in FIGS. 2 and 3, preferably, web spokes 220 are oriented relative to the compliant band 205 across the axial direction A. Tension in web spokes 220 is, therefore, distributed across band 205 to support the load. By way of example, web spokes 220 may be formed of an elastomeric material having a tensile modulus of about 10 to 100 MPa. Web spokes 220 may be reinforced if desired.

For the exemplary embodiment of FIGS. 2 and 3, web spokes 220 are interconnected by radially inner mounting band 225, which encircles the hub 230 to mount tire 201 to the hub 230. Depending on the construction materials and manufacturing process, hub 230, mounting band 225, annular band 205, and web spokes 220 may be molded as single unit. Alternatively, one or more of such components may be formed separately and then attached to each other through e.g., adhesives or molding. Additionally, other components may be included as well. For example, an interface band can be used to connect web spokes 220 at their radially outer ends, and then the interface band would be connected to band 205.

According to a further embodiment, web spokes 220 could be mechanically attached to hub 230, for example, by providing an enlarged portion on the inner end of each web spoke 220 that engages a slot device in hub 230, or by attaching adjacent web spokes 220 to form a loop at a hook or bar formed in hub 230. Substantially purely tensile load support is obtained by having a web spoke 220 that has high effective stiffness in tension but very low stiffness in compression. To facilitate bending in a particular direction, web spokes 220 may be curved. Alternatively, web spokes 220 can be molded with a curvature and straightened by thermal shrinkage during cooling to provide a predisposition to bending in a particular direction.

Web spokes 220 should resist torsion between annular band 205 and hub 230, for example, when torque is applied to wheel 201. In addition, web spokes 220 should resist lateral deflection when, for example, turning or cornering. As will be understood, web spokes 220 that lie in the radial-axial plane, that is, are aligned with both the radial and axial directions, will have high resistance to axially directed forces, but, particularly if elongated in the radial direction R, may have relatively low resistance to torque in the circumferential direction C.

For certain vehicles and applications, for example, those producing relatively low torque, a web spoke package having relatively short spokes 220 aligned with the radial direction R will be suitable. For applications where high torque is expected, one of the arrangements such as shown in FIGS. 5 through 8 of U.S. Pat. No. 7,013,939 may be more suitable. In the variations shown therein, orientations of web spokes are provided that include a force-resisting component in both the radial and the circumferential directions, thus adding resistance to torque, while retaining radial and lateral force-resisting components. The angle of orientation may be selected depending on the number of web spokes used and the spacing between adjacent web spokes. Other alternative arrangements may also be used.

It should be understood that the present invention is not limited to tire 201 as shown in FIG. 2 and, instead, a variety of configurations may be employed. For example, tire 201 could be constructed with the shear band incorporated into a rubber layer such that e.g., sidewalls cover the axial outermost sides of the shear band.

Figure 4:
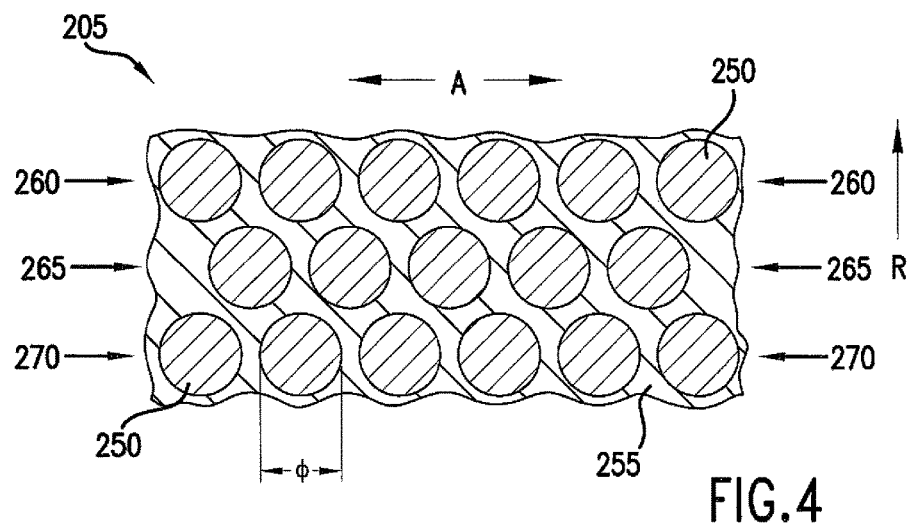
FIG. 4 is a cross-sectional view (taken along line 3-3 of FIG. 2) of a portion of an exemplary embodiment of a shear band as may be used with a non-pneumatic tire such as that shown in FIGS. 1 and 2.

As shown more particularly in the partial cross section view of FIG. 4, annular shear band 205 includes a plurality of discrete, reinforcing elements 250 positioned within an annular shear layer 255 constructed from an elastomeric material. Reinforcing elements 250 are positioned along axially-oriented rows such as e.g., rows 260, 265, and 270. For the exemplary embodiment of FIG. 4, reinforcing elements 250 are interlaced along the radial direction R.

Figure 5:
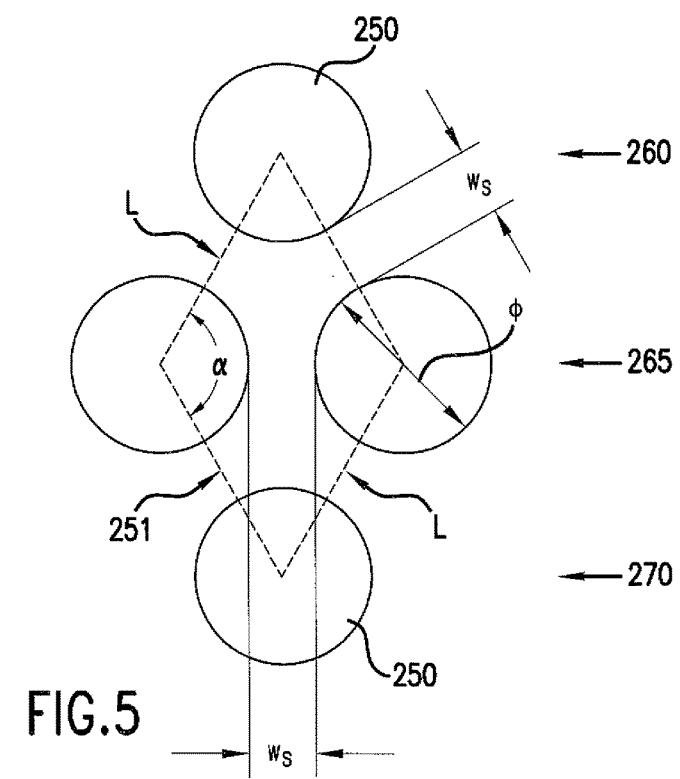
FIG. 5 is a schematic representation of exemplary positioning (e.g., interlaced) of reinforcing elements of the present invention as can be used e.g., in the shear band of FIG. 4.

More specifically, referring now to the schematic representation shown in FIG. 5, reinforcing elements 250 are arranged such that imaginary lines L (shown in phantom) extending between the center point of reinforcing elements 250 located in adjacent, axially oriented rows 260, 265, and 270 will form a rhombus or vertical diamond 251 having an obtuse angle α between certain sides L of the rhombus. Also, reinforcing elements 250 along the same, axially oriented row (such as reinforcing elements in e.g., row 265) will be closer together than reinforcing elements in non-adjacent, axially-oriented rows (such as the reinforcing elements in row 260 relative to row 270).

Figure 6:
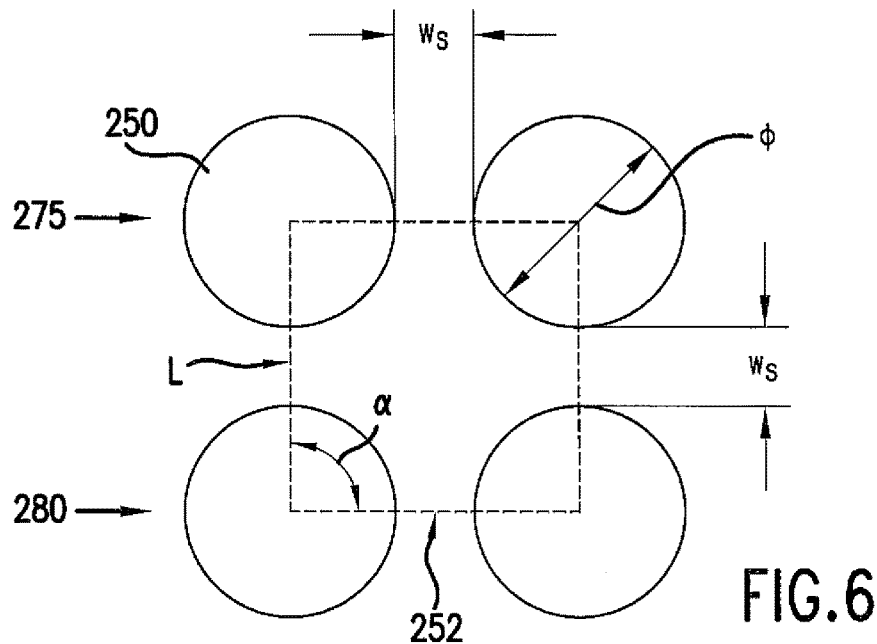
FIGS. 6 and 7 provide schematic representations of non-interlaced reinforcing elements.
Figure 7:
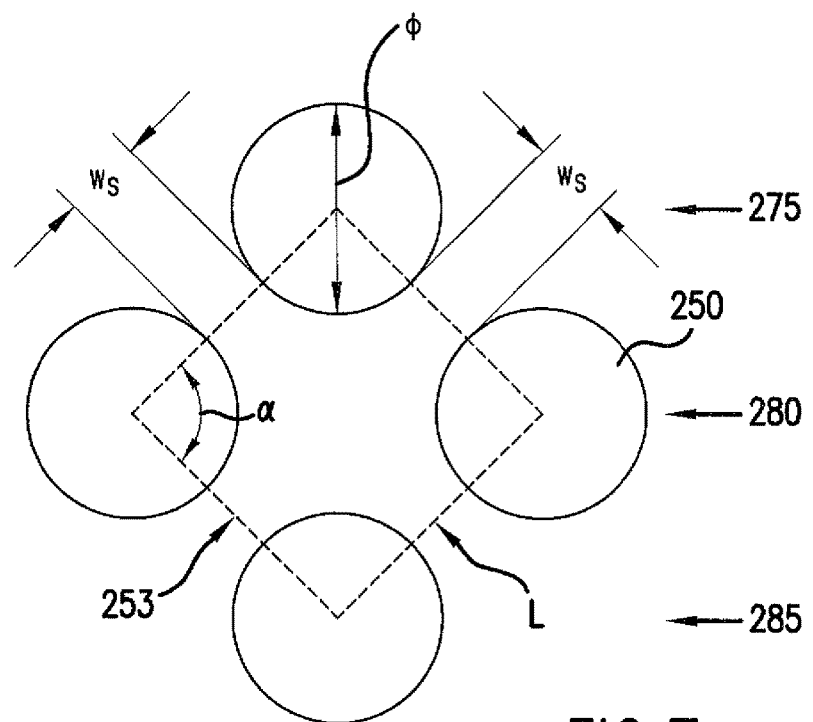

For the sake of clarity, FIGS. 6 and 7 illustrate a positioning of reinforcing elements 250 that are not "interlaced" within the meaning of the present application. In the examples of FIGS. 6 and 7, the centers of reinforcing elements 250 are positioned along a rhombus 252 or 253, respectively. However, angle α as used in these examples is at 90 degrees and reinforcing elements 250, whether along the same or different axially-oriented rows 275, 280, and 285, are all equally spaced.

Figure 8:
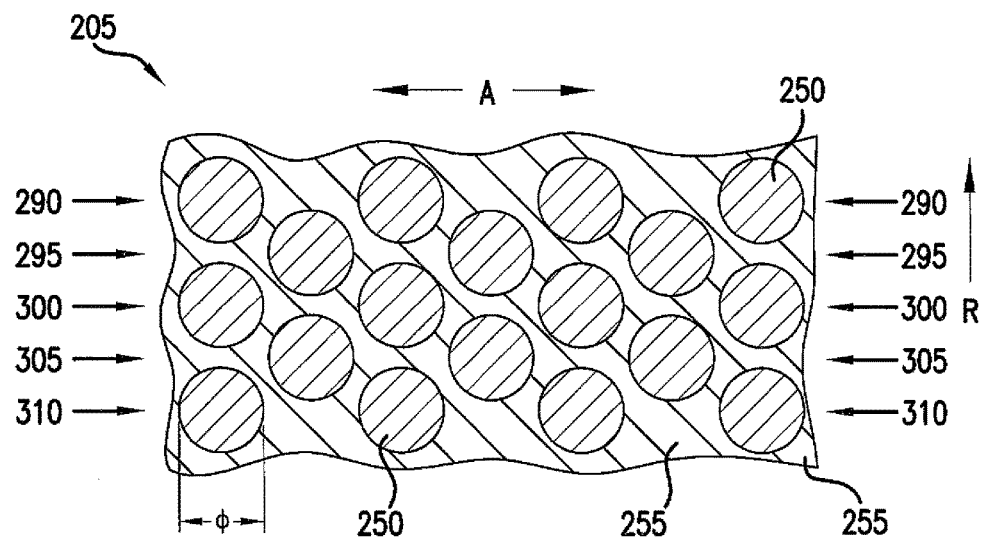
FIG. 8 is a cross-sectional view of a portion of an exemplary embodiment of a shear band as may be used with a non-pneumatic tire such as that shown in FIGS. 1 and 2.

FIG. 8 provides a partial cross sectional view of another exemplary embodiment of shear band 205. Again, annular shear band 205 includes a plurality of discrete, reinforcing elements 250 positioned within an annular shear layer 255 constructed from an elastomeric material. Reinforcing elements 250 are positioned along axially-oriented rows such as e.g., rows 290, 295, 300, 305, and 310. For the exemplary embodiment of FIG. 8, reinforcing elements 250 are interlaced along the axial direction A.

Figure 9:
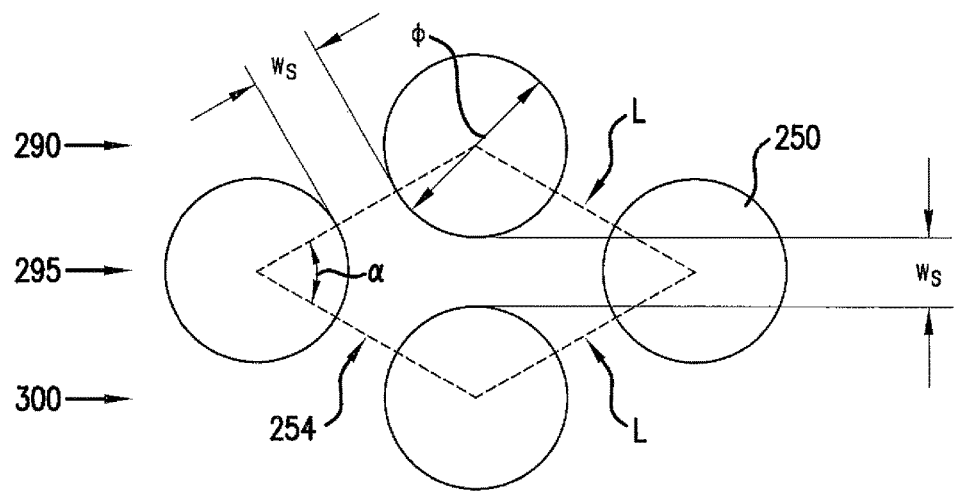
FIG. 9 is a schematic representation of an exemplary positioning (e.g., interlaced) of reinforcing elements of the present invention as can be used e.g., in the shear band of FIG. 8.

More specifically, referring now to the schematic representation shown in FIG. 9, reinforcing elements 250 are arranged such that imaginary lines L (shown in phantom) extending between the center point of reinforcing elements 250 located in adjacent, axially oriented rows 290, 295, 300, 305, and 310 will form a rhombus or horizontal diamond 254 having an acute angle α between certain sides L of the rhombus 254. Additionally, the reinforcing elements 250 along adjacent, axially-oriented rows (such as the reinforcing elements in row 290 relative to row 295 or in row 295 relative to row 300) will be closer together than reinforcing elements positioned along the same, axially-oriented row (such as reinforcing elements 250 in e.g., row 290 or in row 295).

Returning to the interlaced, vertical diamond configuration of FIGS. 4 and 5, reinforcing elements 250 each have a nominal diameter Φ as shown. In certain exemplary embodiments of the invention, the spacing $w_s$ between the reinforcing elements 250 that are positioned along an axially-oriented row (such as e.g., row 265) is in the range of about Φ/2 to about Φ/10, or is about Φ/4. Additionally, in certain exemplary embodiments of the invention, the spacing between the reinforcing elements 250 that are positioned in adjacent, axially-oriented rows (such as e.g., rows 260 and 265 or rows 265 and 270) is in the range of about Φ/2 to about Φ/10, or is about Φ/4.

Returning to the interlaced, horizontal diamond configuration of FIGS. 8 and 9, again reinforcing elements 250 each have a nominal diameter Φ as shown. The reinforcing elements 250 are separated from one another by a predetermined distance, $w_s$. In certain exemplary embodiments of the invention, the spacing $w_s$ between the reinforcing elements 250 that are positioned in adjacent, axially-oriented rows (such as e.g., rows 290 and 295 or rows 295 and 300) is in the range of about Φ/2 to about Φ/10, or is about Φ/4. Additionally, in certain exemplary embodiments of the invention, the spacing between the reinforcing elements 250 that are positioned in non-adjacent, axially-oriented rows (such as e.g., rows 290 and 300 or rows 295 and 305) is in the range of about Φ/2 to about Φ/10, or about Φ/4.

Reinforcing elements 250 can be constructed from a variety of materials. For example, reinforcing elements 255 can be constructed from metallic cables, or cables that are constructed from polymeric monofilaments such as PET (polyethylene terephthalate), or nylon. By way of additional example, reinforcing elements 250 could be constructed from elongate composite elements of monofilament appearance made with substantially symmetrical technical fibers, the fibers being of great lengths and impregnated in a thermoset resin having an initial modulus of extension of at least 2.3 GPa, in which the fibers are all parallel to each other. In such embodiment, the elongate composite elements will deform in an elastic manner up to a compressive strain of at least equal to 2%. As used herein, an elastic deformation means that the material will return approximately to its original state when the stress is released. When the elongate composite elements are deformed in bending, they will have a breaking stress in compression greater than the breaking stress in extension, all as set forth in e.g., U.S. Pat. No. 7,032,637, which is incorporated herein by reference. By way of example, the fibers could be constructed from glass, certain carbon fibers of low Young's modulus, and combinations thereof. Preferably, the thermoset resin has a glass transition temperature $T_g$ greater than 130° C. Advantageously, the initial modulus of extension of the thermoset resin is at least 3 GPa. Reinforcing elements 250 could also be constructed from combinations of PET and such elongate composite elements.

Additionally, reinforcing elements 255 could be constructed from hollow tubes made from rigid polymers such as e.g., PET or nylon. Other materials may be used as well. In certain exemplary embodiments of the invention, preferably reinforcing elements 250 each have a nominal diameter Φ that is in the range of about ND/200 to about ND/1000, where ND is the nominal diameter of shear band 205 (see FIG. 3).

Shear layer 255 can be constructed from a variety of elastomeric materials. For example, shear layer 255 can be constructed from one or more rubber materials, polyurethanes, and combinations thereof.

The shear band 205 constructed as shown can be used in various non-pneumatic tire or wheel constructions including e.g., those set forth herein and others as well. Shear band 205 can allow the use of low shear modulus (i.e. less than 2 MPa) rubber elastomers that will exhibit low loss angles (e.g., less than 0.05 rad), which can have a direct effect on the overall energy dissipation, and therefore rolling resistance, of the tire or wheel into which the shear band 205 is incorporated while simultaneously reducing the amount of deforming elastic material.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An annular shear band defining axial, radial, and circumferential directions, the annular shear band comprising:
   an annular shear layer constructed from at least one elastomeric material, said annular shear layer having a width along the axial direction and having a thickness along the radial direction;
   a plurality of discrete, annular reinforcing elements positioned along a plurality of axially-oriented rows throughout said annular shear layer, wherein along the radial direction alternating rows of said plurality of rows are of the same width and each extend the width of the annular shear layer, said reinforcing elements separated from one another by a predetermined distance; and
   wherein said reinforcing elements are interlaced along the axial or radial direction of the shear band, and wherein a volume fraction of said annular reinforcing elements in said annular shear layer is greater than a volume fraction of said at least one elastomeric material in said annular shear layer.

2. The annular shear band as in claim 1, wherein said reinforcing elements are interlaced along the axial direction.

3. The annular shear band as in claim 2, wherein said reinforcing elements each have a nominal diameter $\Phi$, and wherein reinforcing elements in adjacent, axially-oriented rows of said reinforcing elements are separated from each other by a predetermined distance, $w_s$, in the range of about $\Phi/2$ to about $\Phi/10$.

4. The annular shear band as in claim 3, wherein the predetermined distance, $w_s$, separating reinforcing elements in adjacent, axially-oriented rows of said reinforcing elements is about $\Phi/4$.

5. The annular shear band as in claim 2, wherein said reinforcing elements each have a nominal diameter $\Phi$, and wherein reinforcing elements in non-adjacent, axially-oriented rows of said reinforcing elements are separated from each other by a predetermined distance, $w_s$, in the range of about $\Phi/2$ to about $\Phi/10$.

6. The annular shear band as in claim 5, wherein the predetermined distance, $w_s$, separating reinforcing elements in non-adjacent, axially-oriented rows of said reinforcing elements is about $\Phi/4$.

7. The annular shear band as in claim 2, wherein said reinforcing elements each have a nominal diameter $\Phi$, wherein reinforcing elements in non-adjacent, axially-oriented rows of said reinforcing elements are separated from each other by a predetermined distance, $w_s$, of about $\Phi/4$, and wherein reinforcing elements in adjacent, axially-oriented rows of said reinforcing elements are separated from each other by the predetermined distance, $w_s$, of about $\Phi/4$.

8. The annular shear band as in claim 2, the shear band having a nominal diameter ND, and wherein said reinforcing elements each have a nominal diameter $\Phi$ that is in the range of about ND/200 to about ND/1000.

9. The annular shear band as in claim 1, wherein said reinforcing elements comprise metal, nylon, PET, or glass fibers impregnated in a thermosetting resin.

10. The annular shear band as in claim as in claim 1, wherein adjacent, axially-oriented rows of said reinforcing elements are interlaced along the axial direction and arranged into a horizontal diamond configuration along a cross section of the shear band taken along a plane in which both the axial and radial directions lie.

11. The non-pneumatic wheel comprising the annular shear band of claim 10, and further comprising a tread portion attached directly to said annular shear layer.

12. The annular shear band as in claim 1, wherein said reinforcing elements are interlaced along the radial direction.

13. The annular shear band as in claim 12, wherein said reinforcing elements each have a nominal diameter $\Phi$, and wherein reinforcing elements in adjacent, axially-oriented rows of said reinforcing elements are separated from each other by a predetermined distance, $w_s$, in the range of about $\Phi/2$ to about $\Phi/10$.

14. The annular shear band as in claim 13, wherein the predetermined distance, $w_s$, separating reinforcing elements in adjacent, axially-oriented rows of said reinforcing elements is about $\Phi/4$.

15. The annular shear band as in claim 12, wherein along an axially-oriented row, said reinforcement elements are separated by a distance predetermined distance, $w_s$, in the range of about $\Phi/2$ to about $\Phi/10$.

16. The annular shear band as in claim 15, wherein along an axially-oriented row the predetermined distance, $w_s$, separating adjacent said reinforcing elements is about $\Phi/4$.

17. The annular shear band as in claim 12, wherein said reinforcing elements each have a nominal diameter $\Phi$, wherein reinforcing elements in adjacent, axially-oriented rows of said reinforcing elements are separated from each other by a predetermined distance, $w_s$ of about $\Phi/4$, and wherein reinforcing elements in adjacent reinforcing elements along an axially-oriented row of said reinforcing elements are separated from each other by the predetermined distance, $w_s$, of about $\Phi/4$.

18. The annular shear band as in claim 12, the shear band having a nominal diameter ND, and wherein said reinforcing elements each have a nominal diameter $\Phi$ that is in the range of about ND/200 to about ND/1000.

19. The annular shear band as in claim as in claim 12, wherein adjacent, axially-oriented rows of said reinforcing elements are interlaced along the radial direction and arranged into a vertical diamond configuration along cross section of the shear band taken along a plane in which both the axial and radial directions lie.

20. A non-pneumatic wheel comprising the annular shear band of claim 12.

21. A non-pneumatic wheel comprising the annular shear band of claim 1.

22. The annular shear band as in claim as in claim 1, wherein the annular reinforcing elements comprise elongate composites that are impregnated with a thermoset resin.

23. The annular shear band as in claim as in claim 1, wherein the shear layer comprises rubber elastomers having a shear modulus of less than 2 MPa.

24. The annular shear band as in claim as in claim 23, wherein the shear layer comprises rubber elastomers having a loss angle of less than 0.5 rad.

25. The annular shear band as in claim as in claim 1, wherein said annular shear layer has a constant thickness along the radial direction, and wherein said plurality of axially-oriented rows are distributed over the entirety of the constant thickness of the annular shear layer.

26. The annular shear band as in claim 1, wherein said annular reinforcing elements are distributed throughout the entire annular shear layer.

27. The annular shear band as in claim 1, wherein said annular reinforcing elements are distributed throughout the entire annular shear layer, and wherein the width of said annular shear layer is constant over the thickness of said annular shear layer.

28. The annular shear band as in claim 1, wherein each of said annular reinforcement elements is fully enclosed within said at least one elastomeric material.

29. The annular shear band as in claim 1, wherein the thickness of the annular shear layer is constant.

30. The annular shear band as in claim 1, wherein alternating rows of said plurality of rows have an equal width along the axial direction.

31. A non-pneumatic tire defining axial, radial, and circumferential directions, the non-pneumatic tire comprising:
an annular shear band defining axial, radial, and circumferential directions, the annular shear band including
an annular shear layer constructed from at least one elastomeric material, said annular shear layer having a width along the axial direction and having a thickness along the radial direction;
a plurality of discrete, annular reinforcing elements surrounded by the at least one elastomeric material and positioned along a plurality of axially-oriented rows throughout said annular shear layer, wherein along the radial direction alternating rows of said plurality of rows are of the same width and extend the width of the annular shear layer;

said reinforcing elements separated from one another by a predetermined distance; said reinforcing elements interlaced along the axial or radial direction of the shear band; wherein a volume fraction of said annular reinforcing elements in said annular shear layer is greater than a volume fraction of said at least one elastomeric material in said annular shear layer;

a plurality of tension-transmitting web spokes extending along the axial direction and radially inward from the annular shear band; and a mounting band positioned at a radially-inner end of the web spokes.

* * * * *